N. N. McLeod,
Hose Coupling,
N° 24,179.    Patented May 24, 1859.
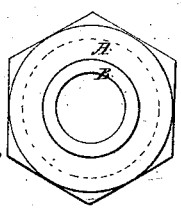
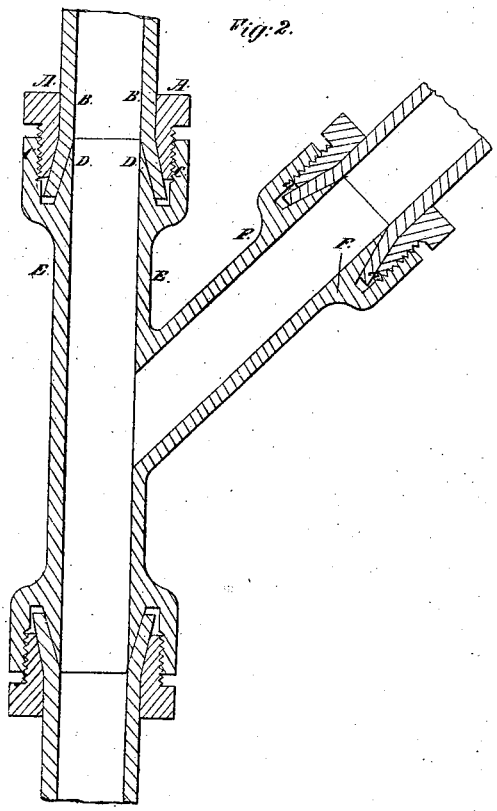
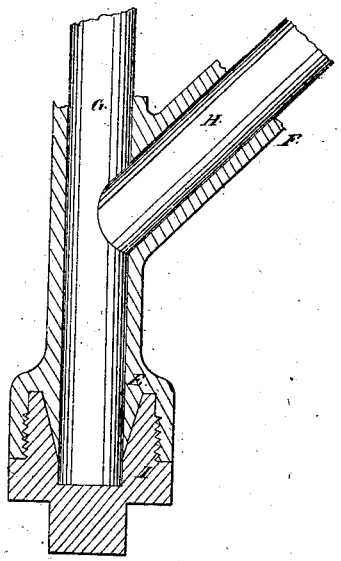

UNITED STATES PATENT OFFICE.

N. N. McLEOD, OF ST. LOUIS, MISSOURI, ASSIGNOR TO CARROLL E. GREY, OF SAME PLACE.

IMPROVEMENT IN HOSE-COUPLINGS.

Specification forming part of Letters Patent No. 24,179, dated May 24, 1859.

*To all whom it may concern:*

Be it known that I, N. N. McLEOD, of the the city and county of St. Louis, and State of Missouri, have invented a new and useful Coupling for Joining Hose and Pipe and Such Like; and I do hereby declare that the following is a full, clear, and exact description of the same, reference being had to the annexed drawings, making part of this specification, in which—

Figure 1 is an end view; Fig. 2, a longitudinal section through the said coupling and pipe to which it is applied, and Fig. 3 shows the cores upon which the said coupling is cast.

To enable others skilled in the arts to make and use my invention, I will proceed to describe its construction and application.

Similar letters of reference represent corresponding parts of the different figures of the accompanying drawings.

The drawings represent the peculiarities of this invention.

E E is a pipe, the end of which is constructed as shown at C D—that is to say, with a double wall, the outside wall being shown at C and the inside one being represented by D. In the inside of the outside wall (represented by C) a screw-thread is cut, which thus forms a nut to receive the screw A, which has a thread to correspond with that cut in the pipe. The inside wall D is made conical on the outside, so as to present a wedging external surface.

B is an end of lead pipe opened so as to fit over the end of the wall D in the manner shown.

When it is desired to make a joint, the screw A is first slipped over the end of the pipe, which is afterward drawn to the shape shown at D—viz., conical—and then brought forward upon the conical-shaped wall or lip D, after which the screw A is screwed into the wall C, which joins the wall of the pipe B hard down upon the wall D, which forms the joint. The thread in the inside of the wall C is cast there over a steel core, (shown at I,) which also forms the inside wall D.

G H shows the core over which the pipe and its branch are cast.

This coupling may of course be as long or short as may be desired, and it may be made with or without a branch, as the case may require. I have represented it with a branch merely to show the facility with which a branch might be introduced into a line of pipe.

The advantage possessed by this coupling is in the fact that it may be made of any length, whereby in case a pipe bursts the fractured part may be cut out and a coupling of equal length with the fractured pipe introduced, which thus repairs the pipe with but one coupling, whereas to amend a fractured pipe with the ordinary short coupling a separate piece of pipe must be used and two couplings, which nearly doubles the time and expense required to make the amendment that is required when this coupling of mine is used.

I do not claim the use of a conical tube as such; but

What I do claim is—

Making the lip C around the conical end D so as to leave a cavity to receive the end of the pipe B and the screw-nut A when the said lip C is a part and portion of the same piece that the core D is, as shown and described.

N. N. McLEOD.

Witnesses:
AMOS BROADNAX,
MICHAEL O'KEEFE.